Figure 1:
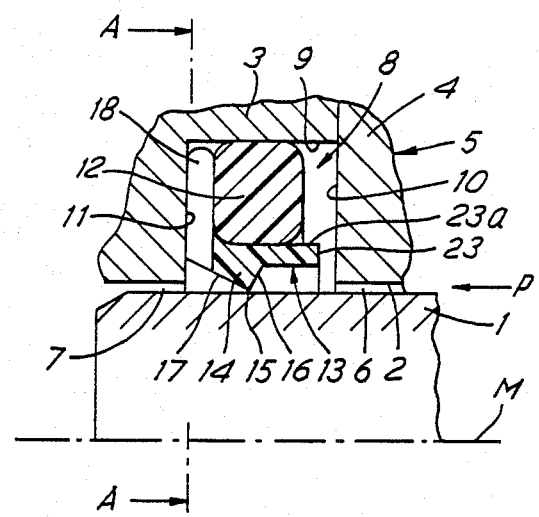

United States Patent [19]

Pedersen

[11] Patent Number: 4,828,272
[45] Date of Patent: May 9, 1989

[54] SEALING APPARATUS WITH ELASTIC SEAL RING AND PLASTIC SLIDE RING

[75] Inventor: Poul H. H. Pedersen, Nordborg, Denmark

[73] Assignee: Danfoss A/S, Nordborg, Denmark

[21] Appl. No.: 162,212

[22] Filed: Feb. 29, 1988

[30] Foreign Application Priority Data

Mar. 21, 1987 [DE] Fed. Rep. of Germany ....... 3709320

[51] Int. Cl.$^4$ .......................... F16J 15/32; F16J 15/38
[52] U.S. Cl. ...................................... 277/165; 277/84; 277/92; 277/95; 277/152
[58] Field of Search ...................... 277/165, 82, 84, 92, 277/95, 152, 83

[56] References Cited

U.S. PATENT DOCUMENTS 3,942,806  3/1976  Edlund ................................ 277/165
4,155,557  5/1979  Grebert ........................... 277/165 X

FOREIGN PATENT DOCUMENTS 2458529  7/1975  Fed. Rep. of Germany ...... 277/165
1438619  6/1976  United Kingdom ................ 277/165

*Primary Examiner*—Robert S. Ward
*Attorney, Agent, or Firm*—Wayne B. Easton; Clayton R. Johnson

[57] ABSTRACT

A hydraulic sealing apparatus for sealing an annular gap between two members which are movable relatively to each other and one of which has an annular groove for receiving the sealing apparatus, the groove having a side wall at least on the low pressure side, comprising an elastic ring and a slide ring which consists of a slidable plastics material and has an annular sealing rib at its free circumferential surface.

6 Claims, 1 Drawing Sheet

SEALING APPARATUS WITH ELASTIC SEAL RING AND PLASTIC SLIDE RING

The invention relates to a hydraulic sealing apparatus for sealing an annular gap between two members which are movable relatively to each other and one of which has an annular groove for receiving the sealing apparatus, the groove having a side wall at least on the low pressure side, comprising an elastic ring and a slide ring which consists of a slidable plastics material and has an annular sealing rib at its free circumferential surface.

In a known sealing apparatus of this kind (U.S. Pat. No. 3,909,016), a cylindrical rod is disposed in the cylindrical bore of a housing. The annular groove is located in the housing. At the bottom of the groove it receives an elastic O ring and at the radial inner end of the groove a slide ring, for example of polytetrafluoroethylene. Its sealing rib, which is in the form of an edge, lies against the cylindrical shank. The flank of this sealing rib facing the pressure side substantially extends in a plane perpendicular to the medial axis. The flank facing the low pressure side has a much smaller inclination to the medial axis and is bounded by a conical surface. Since the elastic ring is compressed during assembly, a radial force is produced with which the sealing rib is pressed against the cylindrical shank. On the occurrence of hydraulic pressure, the elastic ring is compressed and this can give rise to an additional radial force at the sealing rib. Since the elastic ring sealingly abuts the base of the groove, the side wall of the groove on the low pressure side and the slide ring, the pressure side of the gap is sealed from the low pressure side.

This sealing apparatus operates satisfactorily if one of the members memrely executs an axial stroke relatively to the other member. However, if rotational movement occurs instead or in addition, leakages have occurred.

The invention is based on the problem of providing a hydraulic sealing apparatus of the aforementioned kind which is also suitable for sealing an annular gap between two relatively rotating members.

This problem is solved according to the invention in that the slide ring comprises a radial flange extending at least partially along the height of the elastic ring for abutment against the side wall of the annular groove on the low pressure side.

This construction is based on the consideration that, as a result of frictional coupling between the sealing rib and the cylindrical surface co-operating therewith, the slide ring can turn relatively to the annular groove and to the elastic ring. This could lead to leakage between the slide ring and the elastic ring. For this reason a radial flange is provided at the slide ring. Upon pressure loading, this flange is pressed against the side wall of the annular groove on the lower pressure side. The frictional forces thus produced prevent rotation of the slide ring, so that the latter maintains its fixed position in the annular groove or with respect to the elastic ring despite the relative rotation between the two members. Accordingly, no leakage path can be formed between the two rings during operation. By appropriately dimensioning the radial flange, one can ensure that this result is achieved even if the friction between the two parts increases as a result of temperature changes and differences in the coefficient of thermal expansion between the slide ring and the abutting member. Such increase in friction occurs for example when the slide ring consists of polyfluoroethylene, which has a higher coefficient of thermal expansion than steel, and the sealing apparatus has to be used at low temperatures. The radial flange also facilitates assembly because the position for installing the slide ring is more easily recognisable.

If the sealing rib is bounded by two flanks of different inclinations to the medial axis and the flank of smaller inclination is to face the low pressure side, one should ensure that the radial flange is located on the side of the flank having the smaller inclination. The radial flange will then likewise be disposed on the low pressure side. One can recognise immediately whether the position of installation is right or wrong.

It is also favourable for the radial flange to have substantially radially extending incisions. In this way, pressure medium which has possibly penetrated to the low pressure side of the elastic ring can be led off to the outside.

Figure 2:
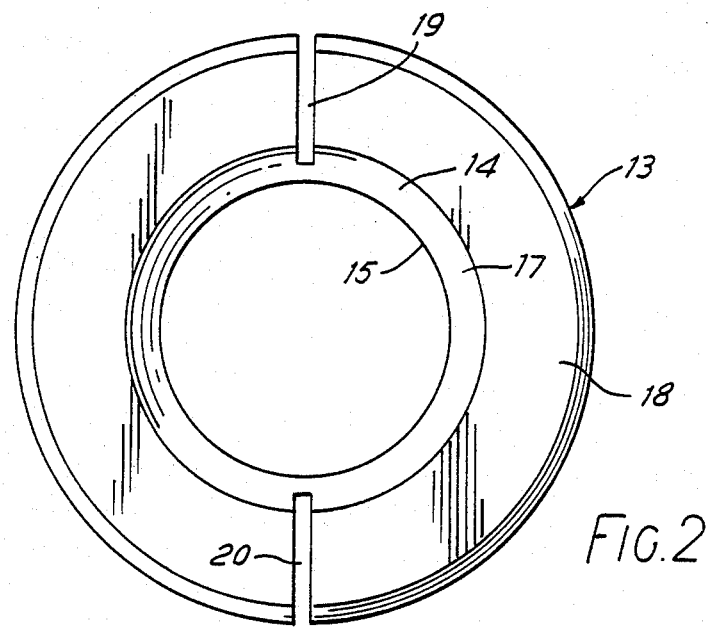
Figure 3:
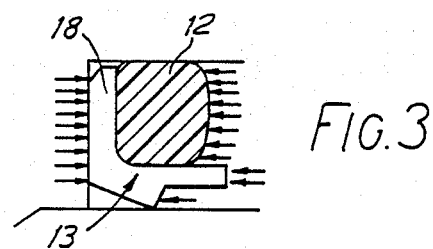

An example of the invention will now be described in more detail with reference to the drawing, wherein:

FIG. 1 is a partial longitudinal section through a sealing apparatus according to the invention, FIG. 2 is an elevation of the slide ring in the direction of the cross-section A—A, and FIG. 3 is a diagram of the loading of the slide ring.

According to FIG. 1, a rotating cylindrical body 1 is arranged in a cylindrical bore 2 of a second member 5 consisting of two housing portions 3 and 4, so that a cylindrical annular gap 6 is formed on the pressure side and a corresponding cylindrical annular gap 7 on the low pressure side. The pressure therefore acts in the direction of the arrow P.

In the outer member 5 there is an annular groove 8 having a groove base 9, a side wall 10 on the pressure side and a side wall 11 on the low pressure side. At the base of this annular groove 8, there is an elastic O ring 12 and at the open end of the groove a slide ring 13 of polytetrafluoroethylene or some other slidable plastics material.

This slide ring 13 has a sealing rib 14 with a sharp edge 15. The sealing rib is bounded by two flanks 16 and 17. The conical surface forming the flank 17 has a smaller inclination to, the medial axis M of the sealing apparatus. On the other hand, the flank 16 forms an angle approaching 90 degrees to the media axis M and therefore practically forms a step. Adjoining the side of the flank 17 there is a radial flange 18 extending between the elastic ring 12 and the side wall 11 on the low pressure side. The radial flange is provided with radial incisions 19 and 20 at opposite sides.

As may be seen from FIGS. 1 and 2, the slide ring has an axially extending flange 23 that has one end joined to the high pressure side to extend axially outwardly thereof and an axially opposite terminal end that is axially more remote from the radial flange than the annular rib. The annular rib is joined to the axial flange to extend radially away therefrom in a direction opposite to the axial flange axially extending surface 23a against which the O-ring 12 abuts. The axial flange extends axially more remote from the radial flange than the O-ring extends axially away from the radial flange.

The elastic ring 12 is already radially compressed as a result of its installation and therefore exerts a certain amount of radial pressure on the slide ring 13. The edge 15 therefore lies against the inner member 1 with a predetermined selectable force. When the pressure P occurs, the elastic ring 12 is axially compressed as shown in FIG. 3, whereby an additional radial force can arise which supports the sealing effect in the region of the edge 15. At the same time, the entire slide ring 13 is axially loaded by the pressure P, partly directly and partly through the elastic ring 12, and is therefore pressed against the side wall 11 of the housing 5. The counterforce thereby created causes the slide ring 13 to make frictional abutment against the side wall 11 with its radial flange 18.

If the inner member now rotates, it will not tend to carry the slide ring 13 with it because the latter is held in the housing under pressure against the side wall 11. Consequently, no leakage gap can be formed between the elastic ring 12 and slide ring 12 as a result of rotation and consequential wear. The seal is therefore maintained permanently.

The radial incisions 19 and 20 serve to lead away through the gap 7 any small amounts of leakage oil which may have reached the low pressure side past the elastic ring 12.

Such a hydraulic sealing apparatus is particularly suitable, for example, for sealing a rotary slide of a hydrostatic steering apparatus in its housing. The edge 15 ensures an adequate seal without extensive friction occurring during rotation of the slide. It can therefore automatically return to the neutral position as is predetermined in such slides by neutral position springs. The slide ring 13 is not carried along by rotation and ensures permanent sealing.

In addition, the slide ring is easier to install because the radial flange 18 predetermines the orientation for installation and because the flange facilitates a better grip of the slide ring.

Naturally, this form of slide ring can be employed for all movements between the members 1 and 5, that is to say, also for axial motion or in the case of helical movement.

I claim:

1. Hydraulic sealing apparatus for providing a seal between the high pressure side and low pressure side in an annular gap between two members with one member being movable relative to the other member and having a medial axis, and an annular groove with a side wall on the low pressure side, comprising an elastic seal ring and a slide ring made of a plastic material and having an annular sealing rib adapted for abutting against the other member and a radial flange having a low pressure annular radial first surface adapted for abutting against the one member side wall and a radial second surface axially opposite the first radial surface in abutting relationship to the seal ring.

2. Hydraulic sealing apparatus according to claim 1, characterized in that the rib is at least in part defined by a first tapered surface and a second tapered surface that is of an opposite taper and is of a smaller angle of inclination relative to the medial axis than the first tapered surface and axially more closely adjacent to the radial flange than the first tapered surface.

3. Hydraulic sealing apparatus according to claim 1, characterized in that the slide ring has an axial flange having the sealing rib joined thereto, one end joined to the radial flange axial opposite surface, an opposite end axially more remote from the radial flange than said rib, and an axially extending surface radially opposite the sealing rib.

4. Hydraulic sealing apparatus according to claim 3, wherein the seal ring abuts against the axial flange axially extending surface radially opposite the annular rib, and that the radial flange extends radially more remote from the medial axis than the axial flange.

5. Hydraulic sealing apparatus according to claim 4, characterized in that the annular rib has a first tapered surface and a second tapered surface, the tapered surfaces converging in an axial direction radial away from the axial flange surface to intersect at a point radially opposite the axial flange from the axial flange surface and axially intermediate the axial flange ends.

6. Hydraulic sealing apparatus for providing a seal between the high pressure side and low pressure side in an annular gap between two members with one member being movable relative to the other member and having a medial axis, an annular groove with a side wall on the low pressure side, comprising an elastic ring and a slide ring made of a plastic material and having an annular sealing rib adapted for abutting against the other member and a radial flange having a low pressure annular radial surface adapted for abutting against the one member side wall and an axial opposite radial surface in abutting relationship to the seal ring, the radial flange having substantially radially extending incisions.

* * * * *